Nov. 24, 1925.

J. HARRIS 1,563,084

SYSTEM FOR OPERATING ALTERNATING CURRENT MOTORS FROM DIRECT CURRENT SOURCES

Filed May 5, 1924

Inventor:
Jesse Harris
By
Attorney.

Patented Nov. 24, 1925.

1,563,084

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

SYSTEM FOR OPERATING ALTERNATING-CURRENT MOTORS FROM DIRECT-CURRENT SOURCES.

Application filed May 5, 1924. Serial No. 711,054.

*To all whom it may concern:*

Be it known that I, JESSE HARRIS, a citizen of the United States, residing at La Fayette, in the county of Tippecanoe and the State of Indiana, have invented a certain new and useful Improvement in Systems for Operating Alternating-Current Motors from Direct-Current Sources, of which the following is a full, clear, concise, and exact description.

The object of my invention is to provide an improved system whereby an alternating electric current motor may be driven by current derived from a direct current supply.

In practicing my invention a thermionic valve is employed to supply current to an oscillatory circuit and a winding of the motor is included in such circuit to take part in regulating the frequency of the current that is employed in such winding to operate the motor, such motor winding thus serving a double purpose.

Figure 1:
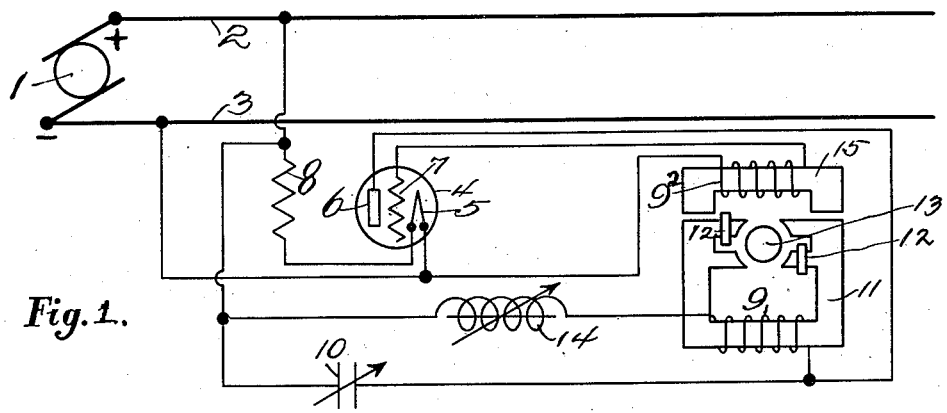
Figure 2:
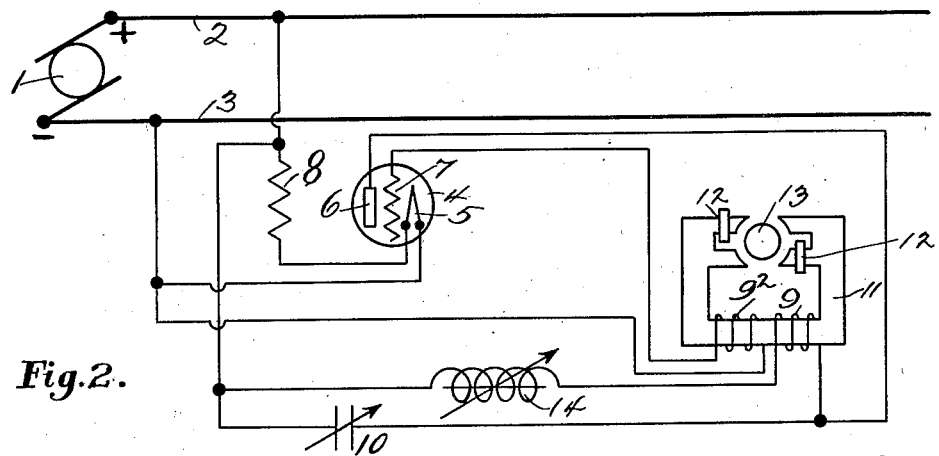

The invention will be more fully explained in connection with the accompanying drawings in which Figs. 1 and 2 diagrammatically illustrate two embodiments thereof. In each system shown the source of direct current is in the form of a dynamo electric machine, though other sources of direct current may be employed. The mains 2 and 3 may supply incandescent lamps or other translating devices with current. In a commercial lighting and power system the current usually impressed upon such a circuit has a pressure of one hundred and ten volts. The thermionic valve 4 in each system illustrated has the usual heating element 5, the output electrode 6 and the grid 7. To avoid the use of a separate source of current for heating the filament, this filament is connected in bridge of the mains 2 and 3, this bridge connection including the current reducing resistance 8 in series with the filament. A transformer is employed which includes the primary winding 9 and the secondary winding $9^2$. The primary winding 9 has one terminal connected with the output electrode 6 of the thermionic valve and has its other terminal connected with the positive main 2 of the direct current distributing system. The secondary $9^2$ has one terminal connected with the negative main 3 of the direct current distributing system and its other terminal connected with the grid 7. The primary 9 is wound about a core 11 of a synchronous motor. In Fig. 2 the secondary coil $9^2$ is wound upon the core 11. In Fig. 1 the secondary $9^2$ is wound upon a core 15 which supplements the core 11. The motor is supplied with phasing coils 12 which complete its formation into a synchronous motor causing the rotation of its squirrel cage armature 13. The primary coil 9 in both systems illustrated has its terminal which is joined with the positive transmission main 2 connected with this main through an external adjustable inductance coil 14. An adjustable condenser 10 is connected in shunt of the two coils 9 and 14 taken together. The motor winding 9 constituting as aforesaid the primary to the coil $9^2$, takes part in determining the frequency of the oscillations of the current in the oscillatory circuit of the thermionic valve, this frequency being further regulated by the inductance coil 14.

While the motors illustrated are synchronous motors, the invention is not to be thus limited.

The motors illustrated are usually small, and may serve any useful purpose that may be served by such small motors. If the motors are synchronous or of constant speed, as illustrated, they may be employed as the constant speed motors in maximum and excess demand meters.

Having thus described my invention, I claim:—

1. The combination with a source of direct current; of a thermionic valve employing a heating element, an output electrode, and a grid; and a motor including a winding connected between the source of direct current and the output electrode of the valve and a winding in secondary relation to the aforesaid winding and having one terminal connected with the grid of the valve and its other terminal connected with the source of direct current.

2. The combination with a source of direct current; of a thermionic valve employing a heating element, an output electrode, and a grid; and a motor including a winding connected between one pole of the source of direct current and the output electrode of the valve and a winding in secondary relation to the aforesaid winding and having one terminal connected with the grid of the valve and its other terminal connected with the other pole of the source of direct current.

3. The combination with a source of direct current; of a thermionic valve employing a heating element, an output electrode, and a grid; a motor including a winding connected between the source of direct current and the output electrode of the valve and a winding in secondary relation to the aforesaid winding having one terminal connected with the grid of the valve and its other terminal connected with the source of direct current; and capacitance in circuit with the first aforesaid winding.

4. The combination with a source of direct current; of a thermionic valve employing a heating element, an output electrode, and a grid; a motor including a winding connected between one pole of the source of direct current and the output electrode of the valve and a winding in secondary relation to the aforesaid winding and having one terminal connected with the grid of the valve and its other terminal connected with the other pole of the source of direct current; and capacitance in circuit with the first aforesaid winding.

In witness whereof, I hereunto subscribe my name.

JESSE HARRIS.